Feb. 25, 1964
R. N. MOTSINGER
3,122,717
PRESSURE TRANSDUCER
Filed June 14, 1961
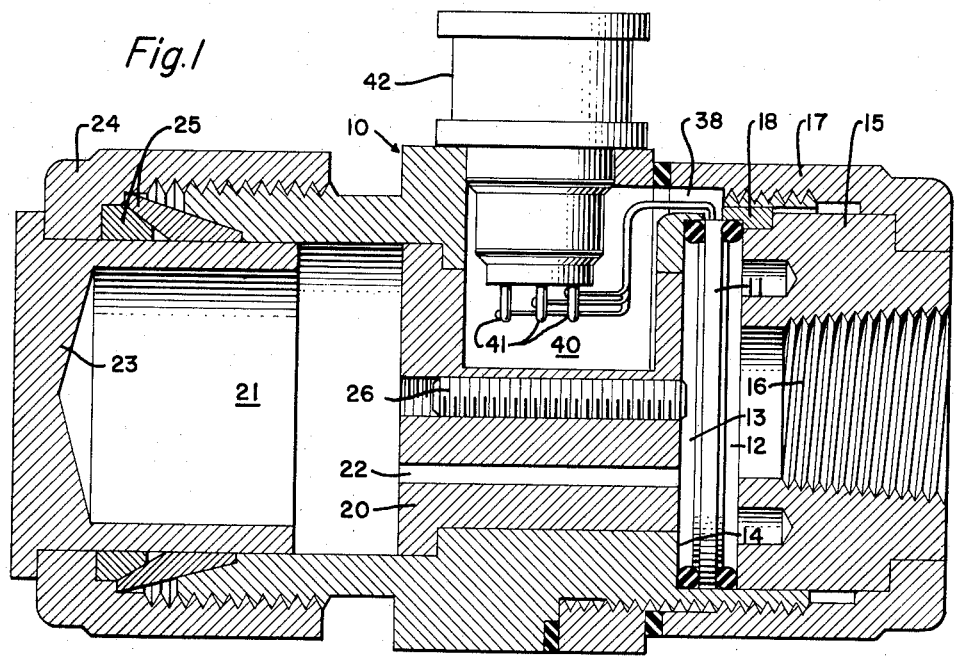
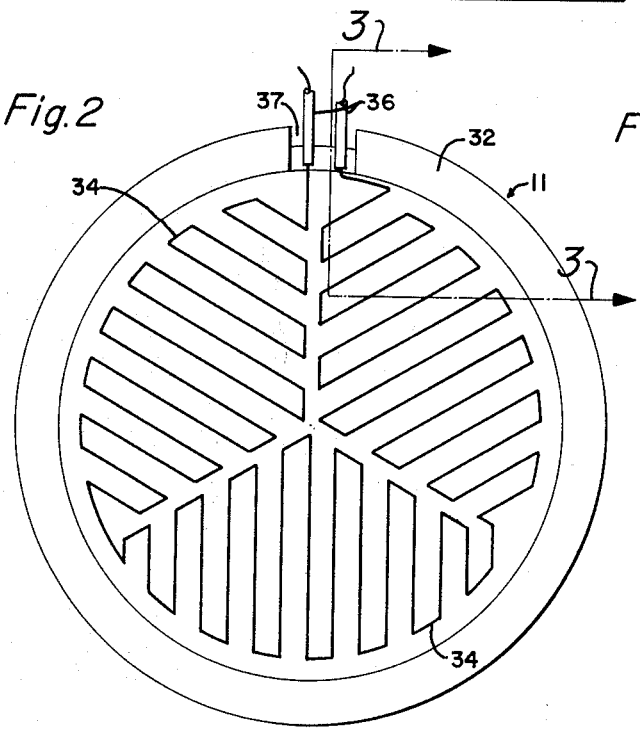
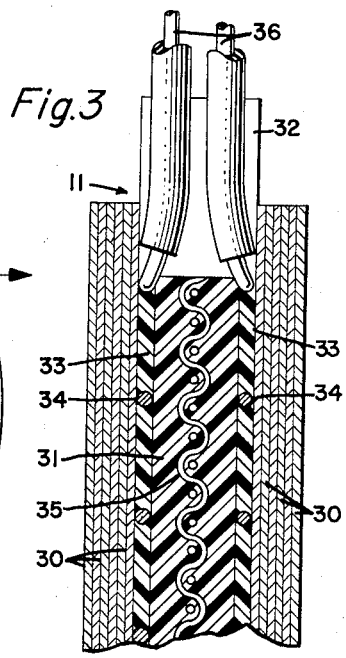
INVENTOR.
RICHARD N. MOTSINGER
BY
*Francis H. Beker*
ATTORNEY

United States Patent Office 3,122,717
Patented Feb. 25, 1964

3,122,717
PRESSURE TRANSDUCER
Richard N. Motsinger, Phoenix, Ariz., assignor to The Garrett Corporation, Los Angeles, Calif., a corporation of California
Filed June 14, 1961, Ser. No. 117,175
12 Claims. (Cl. 338—4)

This invention relates to pressure transducers and aims to provide an improved pressure transducer wherein strain gages are encased within a laminated diaphragm which is mounted for free-edge movement in a supporting structure.

Pressure transducers are used primarily in test work, but there are occasions when they have been incorporated in a turbine engine, for example, and arranged to provide the operator with a continuous indication of certain pressure conditions. One type of pressure transducer now in common use consists of a thin membrane of metal which is machined from a disc and held with its periphery fixed so that pressure may act directly on the disc. Electric resistance strain gages are mounted on the membrane surface and connected to suitable readout instruments for showing or recording the strain produced by changes in pressure.

While such pressure transducers are quite widely used, there have been certain difficulties in both their construction and operation. Fine machining is required to form the metal face elements. When the disc is thin and the flexing or deformation due to pressure causes a deflection greater than half the thickness of the disc, the middle surface becomes strained. Although such strain may be balanced by radial tension at the peripheral edges when such edges are tightly held against rotation, or by circumferential compression if the edges are not horizontally restrained, these strain conditions may cause inaccuracies in the pressure measurements particularly when resistance strain gages are mounted on the disc. Furthermore, such circumferential compression may cause buckling in the diaphragm. Another difficulty is also presented when the strain gages on the diaphragm surface are exposed to conditions which may cause their deterioration and they thus require special coatings and/or waterproofing compounds to cover them.

The present invention is based on the discovery that the foregoing difficulties and disadvantages may be obviated by embedding the strain gages in a comparatively thick laminated diaphragm and mounting and sealing said diaphragm between a pair of suitable O-rings provided in the supporting structure. This arrangement then makes it possible to direct the strain gage lead wires from the side or peripheral edges of the laminations into the space between the O-rings for connection with other conductors leading to the readout equipment.

It is therefore an object of this invention to provide an improved pressure transducer which is subject to none of the difficulties of prior devices for the same purpose.

Another object of this invention is to provide a pressure transducer in which strain gages are encapsulated in a laminated pressure diaphragm mounted in a suitable supporting structure.

Another object of the invention is to provide, in a pressure transducer, a pressure diaphragm comprising a plurality of laminations and a strain gage encased within said laminations.

A further object is to provide a pressure transducer comprising a supporting structure adapted to be mounted in fluid communication with a cavity where the pressure is to be measured, a laminated diaphragm having a reinforced plastic inner portion with a strain gage embedded therein and metallic layers bonded thereto, and a pair of O-rings for mounting and sealing the laminated diaphragm in the supporting structure.

The above and other objects and advantages of the invention will be apparent from the following more detailed description and the accompanying drawing, in which:

FIG. 1 is a longitudinal sectional view of a pressure transducer embodying the principles of this invention;

FIG. 2 is a plan view of the laminated pressure diaphragm used in the transducer, the metal face element on one side being removed to show the strain gage; and FIG. 3 is a partial vertical sectional view on an enlarged scale taken on the line 3—3 of FIG. 2, the thickness of the various layers shown being somewhat exaggerated.

Referring now to the drawing, an improved pressure transducer constructed in accordance with this invention comprises a cylindrical housing 10 having a laminated diaphragm 11 mounted therein between a pair of resilient O-rings 12 and 13. These ring supports for the diaphragm play an effective part in the functioning of the transducer, as will be explained more fully hereinafter. The ring 13 on one side of the diaphragm is supported against a shoulder 14 formed on the inside surface of the housing 10; whereas ring 12 is pressed against the other side of the diaphragm by a plug 15 having a threaded axial bore 16 which may be connected by a suitable conduit to the source of pressure which is to be measured. The plug 15 is held in proper position by a knurled and threaded collar 17 and a cooperating key 18, the collar being secured to a correspondingly threaded end of the housing 10.

A separator 20, in the form of a brass plug, is mounted inside the housing adjacent the shoulder 14 and provides a wall between the diaphragm 11 and a chamber 21 at the opposite end of the housing. An air passage 22 in the separator 20 effects fluid communication between the diaphragm side thereof and the chamber 21. The chamber 21 may be closed by a plug 23 mounted in the end of a second knurled and threaded collar 24 and held in place with a press fit by suitable ferrules 25. This arrangement of the plug 23 and collar is designed to provide attachment for a second line so that differential pressures may be measured. If it is desired to limit the deflection of the diaphragm, a set screw 26 may be axially arranged in the separator plug 20 so that excessive flexing of the diaphragm will be stopped by contact with said set screw.

According to the present invention, the diaphragm 11 is of unique laminar construction, as shown in FIG. 2 and 3. As indicated, said diaphragm comprises outer metallic face elements 30 and a plastic core 31 held in place by spacer ring 32. Core 31 may be made of any suitable material having good creep properties for static strains, such as many plastic materials including the epoxies. To adjust the thickness and sensitivity of the diaphragm, the metallic face elements 30 may be made of the laminated metal known as "shim stock" which consists of a plurality of layers about as thin as foil pressed and held together with an adhesive so that one or more layers may be peeled off as desired, thereby reducing the total thickness of the diaphragm. This form of construction does away with any fine machining and the metal elements may be punched from the shim stock.

Adjacent the inner face of the metallic element 30 on each side of the diaphragm is a layer 33 of plastic and/or adhesive core material, actually a part of the core 31 though it may be formed separately. The core material and that of the layer 33 may be a catalytically set resin, such as a polyester or epoxy resin or any suitable potting compound made from such resins. Adhesive layers 33 on each side of the diaphragm hold resistance strain gages 34 and these are preferably embedded in the adhesive, which may be the same resin as the core 31, with a relatively thin layer separating the strain gage from the inner side of the metal face elements 30. The strain gages shown may be made of foil or fine wire in any desired shape that will adequately cover the circular area, but a rosette shape with three equal segments has advantages in this type of application. One rosette strain gage 34 is provided in each of the layers 33. Thus, the strain gages are on opposite sides of the core 31 which, as mentioned above, may also be made of the same resin as the layers 33 and provided with one or more layers or laminations 35 of reinforcing material, such as fiberglass, embedded therein.

It will be understood that the particular type and shape of the strain gages and their encapsulation in a diaphragm which is supported by O-rings has many advantages. The stress field pattern of the diaphragm when under pressure is simple and no strain output capacity is wasted in the residual or induced diaphragm stresses. The linear range of the device is limited only by the proportional limit of the metal face material. The free-edge feature provided by the O-ring mounting creates no stress nodes to detract from the full use of the diaphragm surface for gages arranged to sense either radial or tangential stresses. The radial stress fields are used and chosen because these stresses drop to zero at the edges of the diaphragm, thereby minimizing any clamping effects that the O-rings might have. In fixed-edge diaphragms, tangential stresses are sensed by special "spiral" gages that must lie within the boundary of the nodal points. Because of the free-edge arrangement, a strain gage grid may point in any direction and still experience only one type of stress, i.e., tension or compression, and thus no special shapes for the strain gage grids are actually required. Since the laminated diaphragm can be made smaller and thicker than the usual metal disc type and still have equal sensitivity, it is apparent that the first natural frequency will be adequately high for good response to variational pressures.

Each of the strain gages 34 has a pair of fine lead wires 36 which are encased in the resin layers and arranged so that they all feed out of the plastic core at substantially the same location on the circumference of the diaphragm. An opening 37 is provided in the spacer ring 32 so that said lead wires 36 may be fed through a channel or passage 38 (FIG. 1) formed in the housing 10 and leading to a junction chamber 40. Here the lead wires may be soldered to connection posts 41 provided in the base of an electrical connection plug 42 fitted into a suitable opening in the housing and adapted to feed into the circuitry of any desired type of readout equipment. It is the mounting of the diaphragm 11 between the O-rings 12 and 13 which permits the lead wires to be led through the opening 37 into the passage 38 at ambient pressure, thus eliminating the need for seals about the wires. This arrangement of the parts would also make it possible to circulate a cooling medium through passage 38 into suitable cooling passages that might be provided in the core 31 of the diaphragm; or, if desired, the core 31 may be made of a suitable porous material through which the cooling fluid could be circulated.

Various changes may be made in the construction and certain features may be used without others without departing from this invention or sacrificing any of its advantages.

I claim:

1. A pressure transducer comprising: a support; a multilayer diaphragm mounted in said support, said multilayer diaphragm consisting of at least one layer of plastic material and a plurality of layers of thin metal removably secured together so that individual layers may be removed to regulate the thickness of said diaphragm; and a resistance strain gage arranged between the layers of said multilayer diaphragm.

2. A pressure transducer comprising: a support; a multilayer diaphragm mounted in said support; means operatively associated with said support for so holding the side edges of said diaphragm that they may have free movement when pressure is applied to said diaphragm; and a resistance strain gage permanently sandwiched between the layers of said diaphragm.

3. A pressure transducer comprising: a support having a cylindrical inner surface; a pair of O-rings arranged in said support for sealing engagement with said inner surface; a multilayer diaphragm mounted in said support between said pair of O-rings and having the edges of the outer faces of said multilayer diaphragm in sealing engagement with said O-rings; and a strain gage sandwiched between the layers of said multilayer diaphragm.

4. A pressure transducer comprising: a support having a cylindrical inner surface; a pair of O-rings arranged in said support for sealing engagement with said inner surface; a multilayer diaphragm mounted in said support between said pair of O-rings and having the edges of the outer faces of said multilayer diaphragm in sealing engagement with said O-rings; and a resistance strain gage permanently sandwiched between the layers of said multilayer diaphragm and having a lead wire disposed between said layers and extending outwardly from said diaphragm between said O-rings.

5. A pressure transducer comprising: a support having a cylindrical inner surface; a pair of O-rings arranged in said support for sealing engagement with said inner surface; a multilayer diaphragm mounted in said support between said pair of O-rings and having the edges of the outer faces of said multilayer diaphragm in sealing engagement with said O-rings, said diaphragm including outer smooth metallic faces and an inner plastic core; and a resistance strain gage embedded in said inner plastic core.

6. A pressure transducer comprising: a support having a cylindrical inner surface; a pair of O-rings arranged in said support for sealing engagement with said inner surface; a multilayer diaphragm mounted in said support between said pair of O-rings and having the edges of the outer faces of said multilayer diaphragm in sealing engagement with said O-rings; a passage formed in said support in communication with the edge of said diaphragm between said O-rings; and a strain gage sandwiched between the layers of said diaphragm.

7. In a diaphragm for a pressure transducer, a metal face member having one side thereof adapted to be exposed to pressure, said metal face member consisting of a plurality of layers of thin metal removably secured together so that individual layers may be removed to regulate the thickness of said face member, a layer of plastic material secured to the other side of said member; and a strain gage embedded in said plastic layer adjacent to said other side of said member.

8. A diaphragm for a pressure transducer, comprising: a pair of metal face members, at least one of said face members consisting of a plurality of layers of thin metal removably secured together so that individual layers may be removed to regulate the thickness of said face member; a reinforced plastic core arranged between said metal face members; and a strain gage embedded in said plastic core.

9. A pressure transducer comprising: a support; a multilayer diaphragm mounted in said support, said multilayer diaphragm consisting of at least one layer of plastic material and a plurality of layers of thin metal removably secured together so that individual layers may be removed to regulate the thickness of said diaphragm; means operatively associated with said support for so holding the side edges of said diaphragm that they may have free movement when pressure is applied to said diaphragm; and a resistance strain gage permanently sandwiched between the layers of said diaphragm.

10. Strain gage supporting means comprising: a pair of laminated metallic disks; a substantially annular spacer member disposed between the peripheral portions of said disks; a body of plastic material enclosed by said spacer member between said disks; and a strain gage embedded in said plastic material, the latter serving to retain the elements in assembled relationship.

11. Strain gage supporting means comprising: a pair of laminated metallic disks; a substantially annular spacer member disposed between the peripheral portions of said disks; a body of plastic material enclosed by said spacer member between said disks; a strain gage embedded in said plastic material adjacent each of said disks; and a fiberglass reinforcing layer embedded in said plastic material between said strain gages, said plastic material serving to retain the elements in assembled relationship.

12. Strain gage supporting means comprising: a pair of laminated metallic disks; a ring-shaped member with spaced ends disposed between the peripheral portions of said disks; a body of plastic material enclosed by said ring-shaped member between said disks; a strain gage with lead wires embedded in said plastic material adjacent each of said disks, said lead wires extending outwardly between the spaced ends of said ring-shaped member; and a fiberglass reinforcing layer embedded in said plastic material between said strain gages, said plastic material retaining the elements in assembled relationship.

References Cited in the file of this patent
UNITED STATES PATENTS

| | | |
|---|---|---|
| 2,332,608 | Schwartz | Oct. 26, 1943 |
| 2,363,181 | Howland | Nov. 21, 1944 |
| 2,400,467 | Ruge | May 14, 1946 |
| 2,425,088 | Dean | Aug. 5, 1947 |
| 2,457,616 | Van Dyke et al. | Dec. 28, 1948 |
| 2,507,501 | Clark | May 16, 1950 |
| 2,662,957 | Eisler | Dec. 15, 1953 |
| 2,770,703 | Sheurich | Nov. 13, 1956 |
| 2,835,774 | Statham | May 20, 1958 |